US008879641B2

(12) United States Patent
Richardson et al.

(10) Patent No.: US 8,879,641 B2
(45) Date of Patent: Nov. 4, 2014

(54) STORAGE OF ADVANCED VIDEO CODING (AVC) PARAMETER SETS IN AVC FILE FORMAT

(75) Inventors: John William Richardson, Hamilton, NJ (US); Jens Cahnbley, Princeton Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2583 days.

(21) Appl. No.: 10/587,111

(22) PCT Filed: Feb. 10, 2004

(86) PCT No.: PCT/US2004/003883
§ 371 (c)(1),
(2), (4) Date: Jul. 24, 2006

(87) PCT Pub. No.: WO2005/086625
PCT Pub. Date: Sep. 22, 2005

(65) Prior Publication Data
US 2008/0253465 A1 Oct. 16, 2008

(51) Int. Cl.
*H04N 7/12* (2006.01)
*H04N 11/02* (2006.01)
*H04N 11/04* (2006.01)
*G06F 17/00* (2006.01)
*G06F 15/16* (2006.01)

(52) U.S. Cl.
USPC ............. 375/240.26; 375/240.25; 375/E7.23; 715/201; 709/200

(58) Field of Classification Search
USPC ........................................ 375/240.26, 240.25
See application file for complete search history.

(56) References Cited

U.S. PATENT DOCUMENTS

| | | | |
|---|---|---|---|
| 6,134,243 A | 10/2000 | Jones et al. | |
| 2002/0135607 A1 | 9/2002 | Kato et al. | |
| 2003/0163781 A1* | 8/2003 | Visharam et al. | 715/500 |
| 2003/0217091 A1 | 11/2003 | Echigo et al. | |
| 2004/0006575 A1* | 1/2004 | Visharam et al. | 707/104.1 |
| 2005/0004968 A1* | 1/2005 | Mononen et al. | 709/200 |

FOREIGN PATENT DOCUMENTS

| | | |
|---|---|---|
| RU | 2273109 | 7/2003 |
| WO | WO 96/42041 A2 | 12/1996 |
| WO | WO 02/39237 A2 | 5/2002 |
| WO | WO 03/073770 | 9/2003 |
| WO | WO03073767 | 9/2003 |
| WO | WO 03/096669 | 11/2003 |
| WO | WO 03/098475 | 11/2003 |
| WO | WO 2005/086625 | 9/2005 |

OTHER PUBLICATIONS

Wenger S. et al., "RTP Payload Format for JVT Video," Feb. 21, 2002, found at http://www.cs.columbia,edu/~hgs/rtp/drafts/draft-wenger-avt-rtp-jvt-00.txt.
Walker T. et al., First Ideas on the Storage of AVC Content in MP4, ISO/IEC JTC1/SC29/WG11, MPEG2001/N4858, International Standard ISO/IEC, May 2002.
Walker. Toby, et al., "File Format for JVT Video based on MP4", Joint Video Team (JVT) of ISO/IEC MPEG & ITU-T VCEG (ISO/IEC JTC1/SC29/WG11 and ITU-T SG16 Q.6). 3$^{rd}$ Meeting: Fairfax, Virginia, USA, Mar. 6-10, 2002, 8 pgs.
V.Illinguorth, Dictionary on Computational Systems, pp. 1-2, Moscow, Machine-producing, 1990.
Search Report dated May 2, 2006.

* cited by examiner

*Primary Examiner* — Hee-Yong Kim
(74) *Attorney, Agent, or Firm* — Robert D. Shedd; Robert B. Levy

(57) ABSTRACT

There is provided a method for employing Parameter Set information corresponding to an Advanced Video Coding (AVC) file. The method includes the step of embedding the Parameter Set information into a Hint Track of the AVC file.

16 Claims, 5 Drawing Sheets

US 8,879,641 B2

STORAGE OF ADVANCED VIDEO CODING (AVC) PARAMETER SETS IN AVC FILE FORMAT

This application claims the benefit, under 35 U.S.C. §365 of International Application PCT/US2004/003,883, filed Feb. 10, 2004, which was published in accordance with PCT Article 21(2) on Sep. 22, 2005 in English.

BACKGROUND OF THE INVENTION

1. Field of the Invention

The present invention generally relates to the Advanced Video Coding (AVC) file format and, more particularly, to the storage of AVC Parameter Sets in the AVC file format.

2. Background of the Invention

The Advanced Video Coding (AVC) file format provides support for both streaming media data over a network as well as local playback. The most common streaming servers use the Real Time Streaming Protocol (RTSP) along with the Session Description Protocol (SDP) as a control protocol for the set up and teardown of multimedia streaming sessions between clients and servers. Further, the Real Time Transport Protocol (RTP) is used as the protocol for data transport for the multimedia information between the servers and clients.

An AVC codec provides a means for decoupling specific information from the video stream that is relevant for more than one video frame. It is intended that this specific information be sent over a reliable transport protocol (such as, e.g., Transmission Control Protocol (TCP)), in addition to being sent over an unreliable transport protocol (such as, e.g., User Datagram Protocol (UDP)), embedded within the multimedia stream. This specific information combined together form a Parameter Set. An AVC Parameter Set may include information such as, for example: picture or image size; display window size; macro block allocation map; and so forth.

One or many Parameter Sets may exist for any given AVC video stream. The encoder and decoder should maintain an identical list of the Parameter Sets. Each slice header within the AVC video stream includes a code that indicates the Parameter Set to be used when decoding. Based on this code, the decoder can then determine which Parameter Set to use for proper decoding. Since the Parameter Sets are decoupled from the main video stream, it is possible and desirable to send them from a multimedia streaming server to a multimedia streaming client in an out-of-band fashion.

A description of a typical scenario of a streaming multimedia transaction will now be given. When a multimedia streaming client requests streaming multimedia from a server, an initial negotiation is typically done prior to the streaming. The initial negotiation sequence involves the client sending a request to the server to obtain information about a particular stream. Afterwards, the server sends a response to the client with the minimal necessary details required for receiving and decoding the stream. This initial negotiation is commonly done using a network protocol such as the Real Time Streaming Protocol (RTSP). The RTSP protocol can be used to send the Parameter Sets from the multimedia streaming server to the multimedia streaming client. However, due to the nature of the streaming server, for the streaming server to send the media dependent data to the client, the Parameter Sets must be stored in the file in a manner such that the streaming server does not know or care what type of multimedia file it is.

Accordingly, it would be desirable and highly advantageous to have a method for enabling the RTSP protocol of the multimedia streaming server to transport Parameter Sets in a media independent manner to the client.

SUMMARY OF THE INVENTION

The problems stated above, as well as other related problems of the prior art, are solved by the present invention, a method for storing AVC Parameter Sets in the AVC file format. The present invention provides an extension to the AVC file format for the purpose of storing enhanced metadata to improve streaming services. The extension involves inserting AVC Parameter Sets into the Hint Track metadata of the AVC file format while still being able to provide backwards compatibility with existing streaming servers.

According to an aspect of the present invention, there is provided a method for employing Parameter Set information corresponding to an Advanced Video Coding (AVC) file. The method includes the step of embedding the Parameter Set information into a Hint Track of the AVC file.

According to another aspect of the present invention, there is provided an apparatus for employing Parameter Set information corresponding to an Advanced Video Coding (AVC) file. The apparatus includes an embedding device for embedding the Parameter Set information into a Hint Track of the AVC file.

According to yet another aspect of the present invention, there is provided a method for employing Parameter Set information corresponding to an Advanced Video Coding (AVC) file. The method includes the steps of embedding the Parameter Set information into a Hint Track of the AVC file, and transmitting the Parameter Set information in an out of band and media independent transmission.

These and other aspects, features and advantages of the present invention will become apparent from the following detailed description of preferred embodiments, which is to be read in connection with the accompanying drawings.

DETAILED DESCRIPTION OF THE INVENTION

Figure 1:
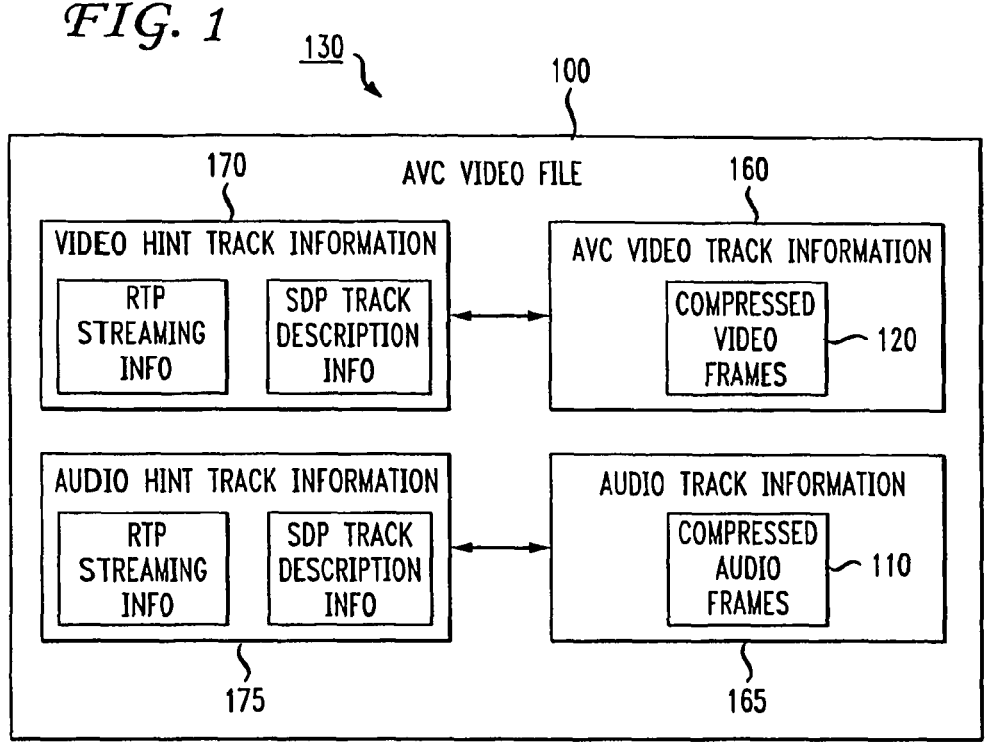
FIG. 1 is a diagram illustrating an Advanced Video Coding (AVC) file 100 to which the present invention may be applied, according to an illustrative embodiment of the present invention.

The present invention is directed to an extension to the AVC file format, a commonly known streaming digital media storage format, for the purpose of storing enhanced metadata to improve streaming services. The extension involves inserting AVC Parameter Sets into the Hint Track metadata of the AVC file format while still being able to provide backwards compatibility with existing streaming servers. The Parameter Sets are embedded within the AVC file format Hint Track such that the RTSP protocol of the multimedia streaming server is able to transport the Parameter Sets in a media independent fashion to the client.

It is to be appreciated that the present invention generally relates to the Advanced Video Coding (AVC) file format (International Organization for Standardization/International Electrotechnical Commission (ISO/IEC) 14496, Part 15), jointly developed by the International Telecommunication Union (ITU) and the Moving Pictures Experts Group (MPEG). However, given the teachings of the present invention provided herein, one of ordinary skill in the related art will contemplate this and various other file formats to which the present invention may be applied while maintaining the spirit and scope of the present invention.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The AVC file format provides support for both streaming media data over a network as well as local playback. An AVC file that supports streaming multimedia includes additional information about the data units to stream. This additional information is included in additional tracks of the file known as Hint Tracks. A Hint Track provides streaming instructions to a server such as, for example, packet formatting information to ensure suitable delivery and timing information to ensure proper transmission timing. In additional, a Hint Track may also provide more information such as details on the type of media that the client is requesting, which then may be sent to the client during an initial interaction between the client and server.

The most common streaming servers use the Real Time Streaming Protocol (RTSP) along with the Session Description Protocol (SDP) as a control protocol for the set up and teardown of multimedia streaming sessions between clients and servers. Further, the Real Time Transport Protocol (RTP) is used as the protocol for data transport for the multimedia information between the servers and clients. It is to be appreciated that the present invention is directed towards streaming servers that use RTSP as their control protocol for session establishment. Of course, one of ordinary skill in the related art will readily appreciate that the present invention may also be modified and implemented with respect to streaming servers that use a protocol other than RTSP as their control protocol, while maintaining the spirit and scope of the present invention.

RTSP is a text-based protocol where messages include a header and payload. The header is commonly defined by the standard, whereas portions of the payload can be application dependent. In the case of an RTSP based multimedia streaming server, the server by default inserts Session Description Protocol (SDP) information included within the AVC file into the RTSP message during initial media streaming negotiation with a client. Therefore, by embedding the AVC Parameter Sets within the SDP information, it is possible for the server to transmit the Parameter Sets of the media stream to the client without having knowledge of the media format. As a result, the Parameter Sets are transmitted prior to any media, and in addition, they are transmitted using a reliable transport protocol since RTSP by default uses Transmission Control Protocol (TCP).

FIG. 1 is a diagram illustrating an Advanced Video Coding (AVC) file 100 to which the present invention may be applied, according to an illustrative embodiment of the present invention. The AVC file 100 includes AVC video track information 160, audio track information 165, video hint track information 170, and audio hint track information 175. The AVC file 100 further includes audio tracks 110, video tracks 120, and hint tracks 130. The hint tracks 130 may be used for streaming purposes according to the present invention.

The Hint Tracks 130 within the AVC file 100 include special instructions for a streaming server to assist in the formation of packets. This information is provided in such a way that a server is able to packetize the media data in the manner suitable for streaming using a specific network transport. In addition to the inclusion of special streaming instructions, other data may be embedded within the Hint Track that the server is instructed to send immediately to the client (for example and in accordance with the present invention, the other data may include Parameter Sets).

Figure 2:
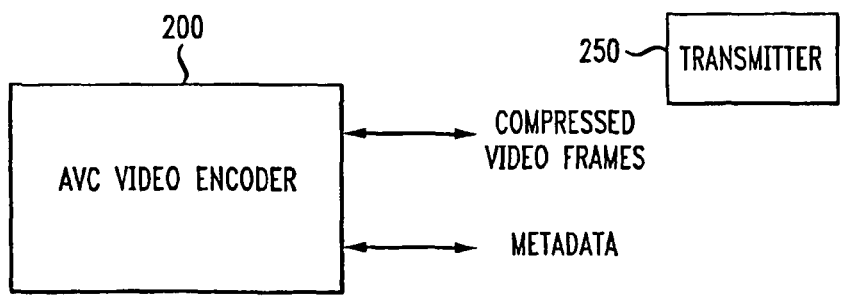
FIG. 2 is a diagram illustrating an Advanced Video Coding (AVC) video encoder 200 to which the present invention may be applied, according to an illustrative embodiment of the present invention.

The process of storing AVC parameter Sets within the Hint Track of an AVC file will now be described. FIG. 2 is a diagram illustrating an Advanced Video Coding (AVC) video encoder 200 to which the present invention may be applied, according to an illustrative embodiment of the present invention. Initially, the AVC video encoder 200 will have at least one output interface for delivering the compressed video data and the corresponding metadata to a second module for storage purposes. Also included in FIG. 2 is a transmitter 250 for transmitting the Parameter Sets in an out-of-band transmission. The Parameter Sets are transmitted while embedded within the SDP payload of an AVC file.

Figure 3:
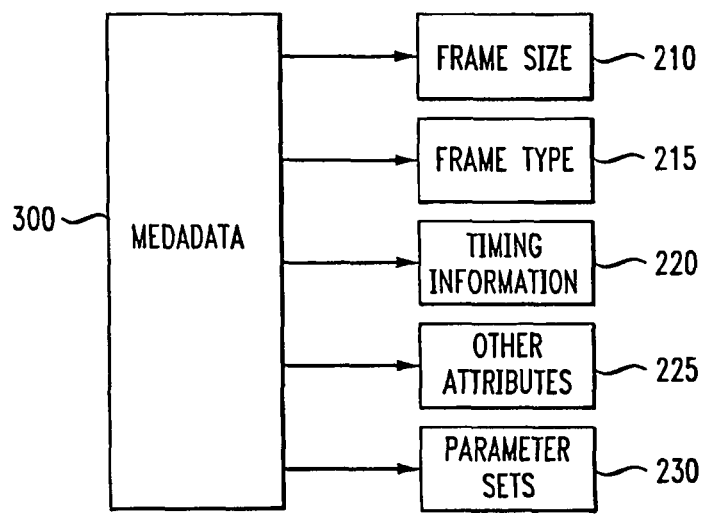
FIG. 3 is a diagram illustrating exemplary metadata 300 output from the AVC encoder 200 of FIG. 2, according to an illustrative embodiment of the present invention.

FIG. 3 is a diagram illustrating exemplary metadata 300 output from the AVC encoder 200 of FIG. 2, according to an illustrative embodiment of the present invention. The metadata 300 that is delivered from the AVC video encoder 200 may include information such as the size 210 of the compressed video frame, the type 215 of the video frame (e.g., I-frame, P-frame, and B-frame), timing information 220 (e.g., frame rate), other attributes 225, and new Parameters Sets 230. Of particular interest in this application is the Parameter Sets 230, because the Parameter Sets 230 will be stored in the AVC file within the video stream as well as in the Hint Track that references the video stream. Thus, for the Parameter Sets 230 to be stored within the Hint Tracks, the data being received on the output interface of the AVC video encoder will need to be properly managed.

When Parameter Sets 230 are part of the Metadata 300 output from the AVC video encoder, they are copied and stored in a repository for later referencing when the Hint Track is created. This allows the Hint Track creation to be more streamlined and straightforward because the media track does not need to be parsed beginning to end to find the Parameter Sets.

Figure 4:
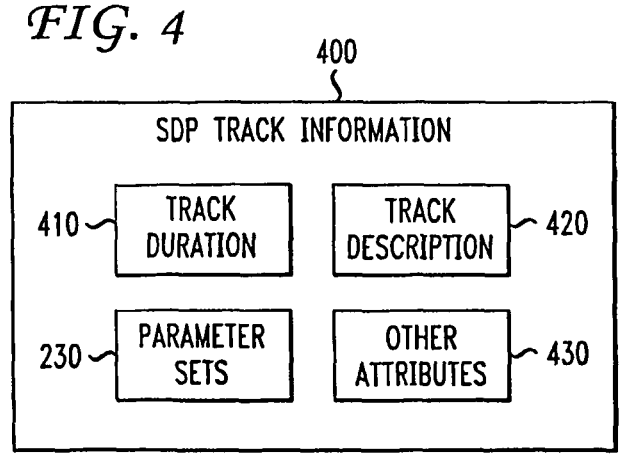
FIG. 4 is a diagram illustrating Session Description Protocol (SDP) track description information 400, according to an illustrative embodiment of the present invention.

FIG. 4 is a diagram illustrating Session Description Protocol (SDP) track description information 400, according to an illustrative embodiment of the present invention. The AVC Parameter Sets 230 are stored within the SDP track description information 400 included within the Hint Track. Storing the Parameter Sets 230 in the Hint Track provides a means for transporting the Parameter Sets 230 using a reliable network transport during the initialization of a stream session. Equally important, backwards compatibility is provided to current streaming servers because an additional extension to the file is not required. The SDP track description information 400 further includes track duration information 410, track description information 420, and other attributes 430. Table 1 illustrates the storage of AVC Parameter Sets within Session Description Protocol (SDP) track description information, according to an illustrative embodiment of the present invention.

TABLE 1

```
v=0
s=AVC Streaming Media Program
u=http://
e=admin @
a=control:*
a=range:npt=0 - 60.96
m=video 0 RTP/AVP 96
a=rtpmap:96 AVC/90000
a=paramset:"data:video/jvt;base64,MIME encoded Parameter Sets"
a=control:trackID=2
m=audio 0 RTP/AVP 14
a=rtpmap:14 MPA/22050
a=control:trackID=6
```

Parameter Set information can be encoded in Multipurpose Internet Mail Extensions (MIME) prior to being embedded within the SDP payload of the Hint track.

Figure 5:
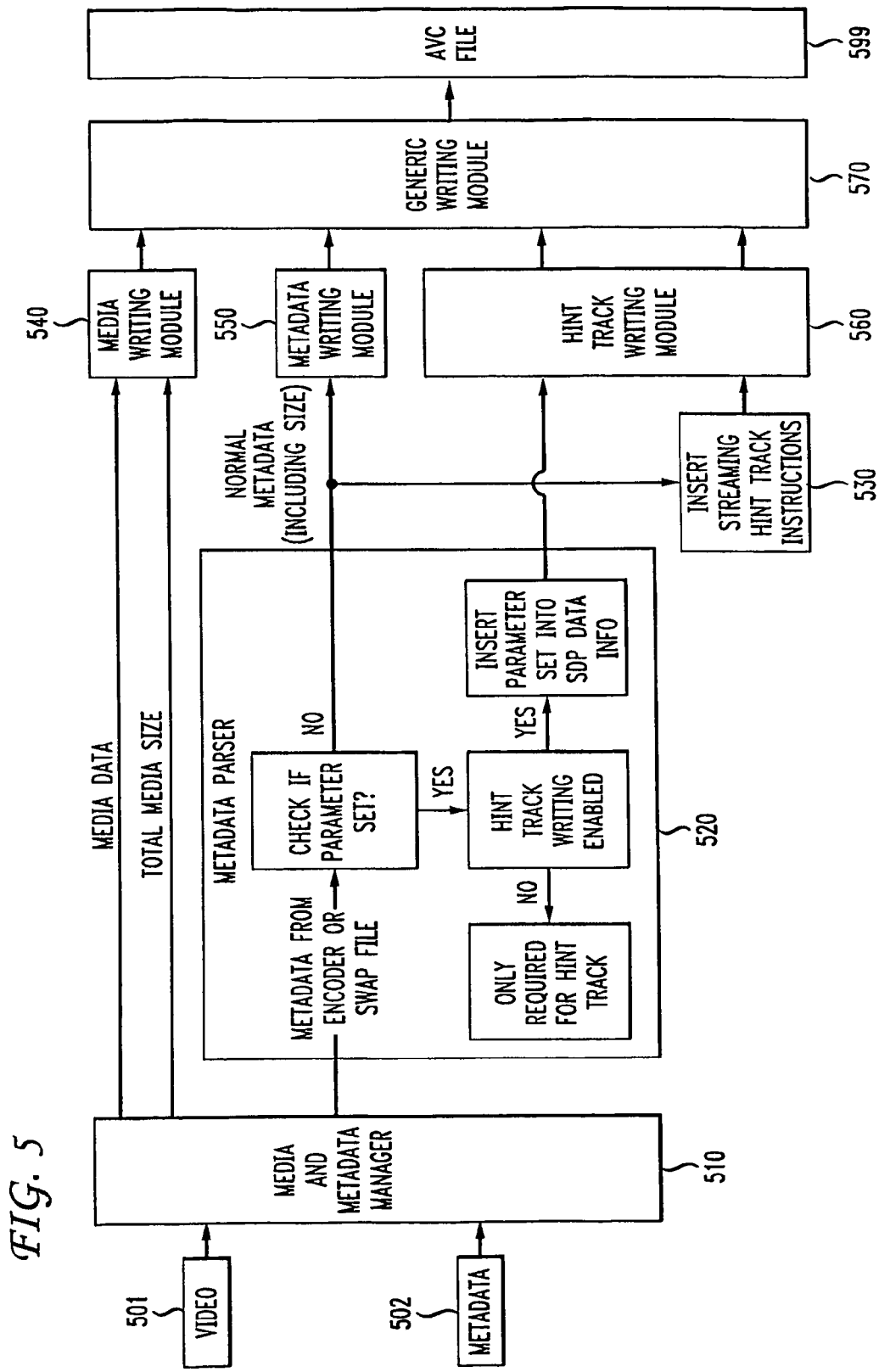
FIG. 5 is a high-level block diagram illustrating an apparatus 500 for inserting Parameter Sets into the Hint Tracks of an AVC file 599, according to an illustrative embodiment of the present invention.

FIG. 5 is a high-level block diagram illustrating an apparatus 500 for inserting Parameter Sets into the Hint Tracks of an AVC file 599, according to an illustrative embodiment of the present invention. The apparatus 500 includes a media and metadata manager 510, a metadata parser 520, an insertion module 530, a media writing module 540, a metadata writing module 550, a hint track writing module 560, and a generic file writing module 570.

Video data 501 and metadata 502 are received by the media and metadata manager 510. The media and metadata manager 510 ensures the file writing process is done properly and that the file is not written in an inconsistent manner. In most cases, the metadata 502 should reside within the file first, followed by the media data tracks and the hint tracks. Therefore, the media and metadata manager 510 is present to control the writing process.

There are three main writing modules (540, 550, 560) that interface to the generic file writing module 570. It may appear that each of these modules are sending data to the generic file writing simultaneously, but they are actually sending data to be written in a particular order (e.g., the order described above, that being metadata, media data, and hint data). These writing modules will now be further described with respect to FIGS. 6-8.

Figure 6:
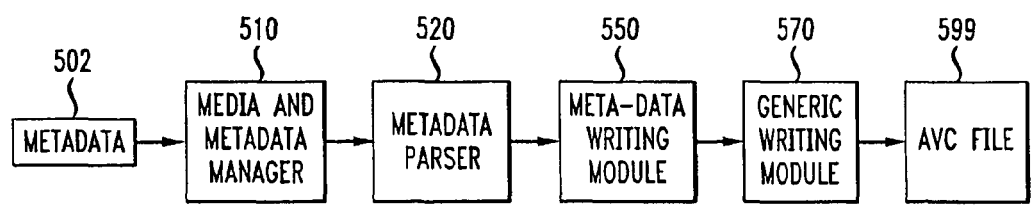
FIG. 6 is a high-level block diagram illustrating the generation of metadata tables and the writing of the metadata tables to an AVC file, according to an illustrative embodiment of the present invention.
Figure 7:
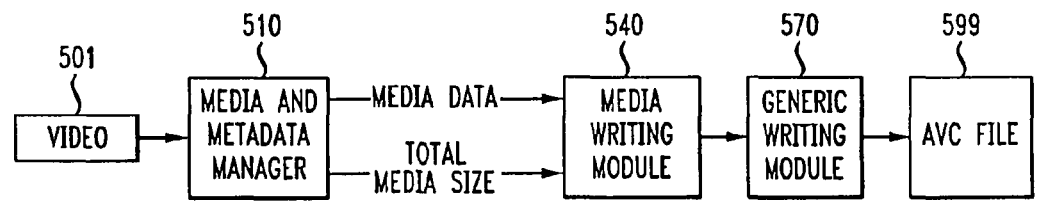
FIG. 7 is a high-level block diagram illustrating the writing of media data to an AVC file, according to an illustrative embodiment of the present invention.
Figure 8:
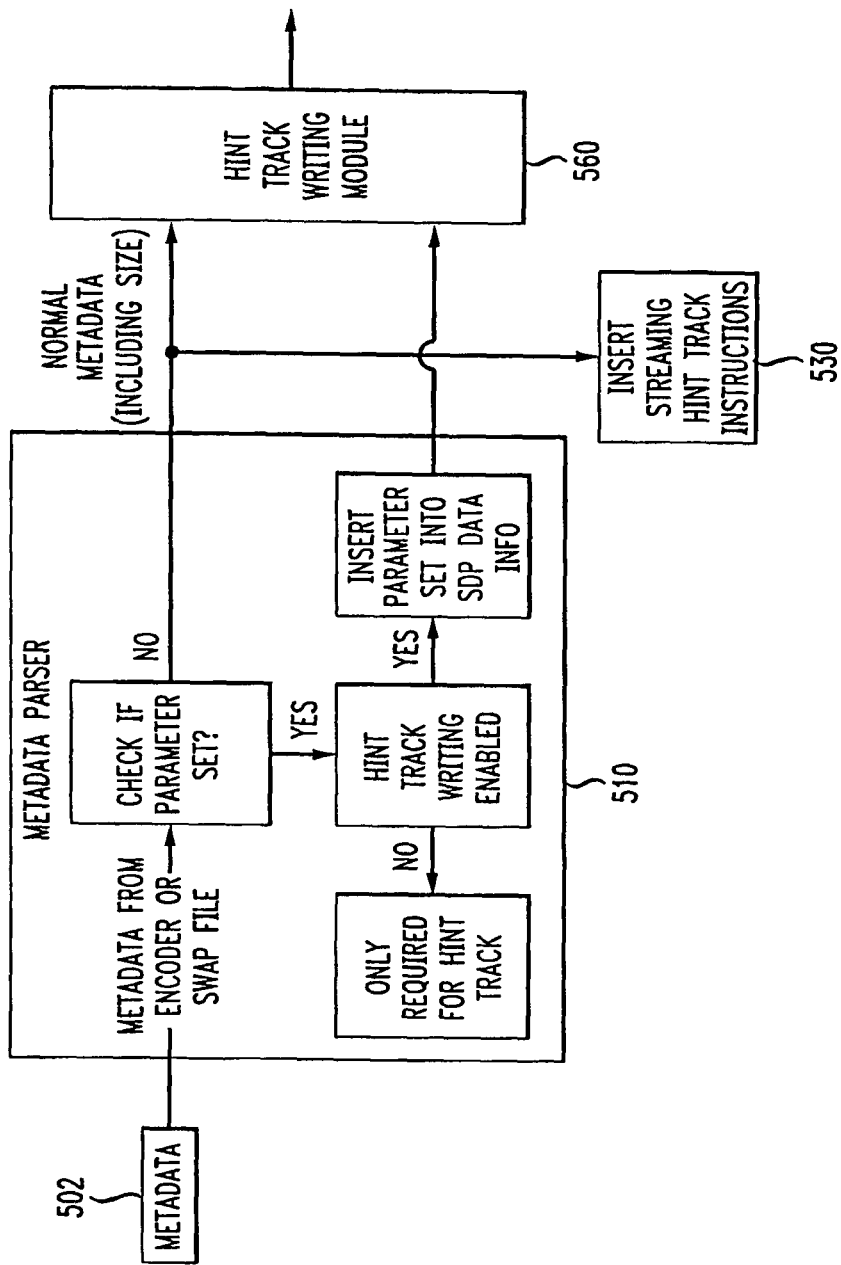
FIG. 8 is a high-level block diagram illustrating the writing of a hint track to an AVC file, according to an illustrative embodiment of the present invention.

FIG. 6 is a high-level block diagram illustrating the generation of metadata tables and the writing of the metadata tables to an AVC file, according to an illustrative embodiment of the present invention. FIG. 7 is a high-level block diagram illustrating the writing of media data to an AVC file, according to an illustrative embodiment of the present invention. FIG. 8 is a high-level block diagram illustrating the writing of a hint track to an AVC file, according to an illustrative embodiment of the present invention. As noted above, the writing of an AVC Hint Track to an AVC file involves extracting the Parameter Sets from the metadata and storing them in the Hint Track SDP information.

Referring to FIGS. 6 and 8, metadata is input to the media and metadata manger 510. As is known, metadata is a set of data structures for storing media dependent information such as, but not limited to, timestamps, frame sizes, parameters sets, and so forth. Metadata is used, for example, to keep the corresponding media in synchronization with additional data for the purposes of, e.g., decoding, encoding, displaying, access, and transmission.

The media and metadata manager 510 extracts the metadata from the media and parses the metadata for Parameter sets (see FIG. 8). Thus, if parameter sets are present in the metadata, the metadata parser 520 will extract the Parameter Sets and feed them into the Hint track's SDP data structure. Otherwise, when a Parameter Set is not found, the metadata parser 520 transforms the metadata into standardized data structures that provide a means for writing the information to a file. The metadata writing module 550 uses the Application Programming Interface (API) of the generic writing module 570 to write the metadata to the AVC file 599.

In FIG. 7, the media and metadata manager 510 extracts the media and the total size of the media. The data is then fed directly to the media writing module 540. The media writing module also uses the API of the generic writing module 570 to write the media samples to the AVC file 599.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for streaming a file containing video information, comprising the step of:
    embedding parameter information for facilitating streaming of the video information by embedding the parameter information in a Session Description Protocol (SDP) payload of a hint track of the file, the file also holding the video information such that the parameter information resides separate from the video information so that the parameter information can be streamed independent of the video information.

2. The method of claim 1, wherein the step of embedding the parameter further comprises the step of encoding the parameter information in Multipurpose Internet Mail Extensions (MIME) prior to being embedded within the SDP payload of the Hint track.

3. The method of claim 1, further comprising the step of transmitting the parameter information in an out-of-band transmission.

4. The method of claim 3, wherein said transmitting step further comprises the step of transmitting the parameter information using Transmission Control Protocol (TCP).

5. The method of claim 3, wherein said transmitting step further comprises the step of transmitting the parameter information using Real Time Streaming Protocol.

6. The method of claim 1, further comprising the step of transmitting the parameter information in a media independent transmission.

7. The method of claim 1, wherein said transmitting step comprises the step of transmitting the parameter information prior to any media corresponding thereto.

8. The method of claim 1, further comprising the step of extracting the parameter information from metadata corresponding to at least one media stream.

9. An apparatus for employing parameter information corresponding to a video information file, comprising:
an embedding device embedding for parameter information for facilitating streaming of the video information by embedding the parameter information in a Session Description Protocol (SDP) payload of a hint track of the file, the file also holding the video information such that the parameter information resides separate from the video information so that the parameter information can be streamed independent of the video information.

10. The apparatus of claim 9, wherein the parameter information embedded within the SDP payload by said embedding device is encoded in Multipurpose Internet Mail Extensions (MIME).

11. The apparatus of claim 9, further comprising a transmitter for transmitting the parameter information in an out-of-band transmission.

12. The apparatus of claim 11, wherein said transmitter transmits the Parameter Set information using Transmission Control Protocol.

13. The apparatus of claim 11, wherein said transmitter transmits the Parameter Set information using Real Time Streaming Protocol.

14. The apparatus of claim 9 further comprising a transmitter for transmitting the parameter information in a media independent transmission.

15. The apparatus of claim 9, wherein said transmitter transmits the parameter information prior to any media corresponding thereto.

16. The apparatus of claim 9, further comprising an extractor for extracting the parameter from metadata corresponding to at least one media stream.

* * * * *